UNITED STATES PATENT OFFICE.

HERMAN WILLEM KNOTTENBELT, OF ST.-GILLES, BRUSSELS, BELGIUM.

PETROLEUM AND OTHER HYDROCARBON OILS.

1,277,605.  Specification of Letters Patent.  Patented Sept. 3, 1918.

No Drawing. Original application filed January 13, 1910, Serial No. 537,858. Divided and this application filed July 3, 1916. Serial No. 107,464.

*To all whom it may concern:*

Be it known that I, HERMAN WILLEM KNOTTENBELT, a subject of the Queen of Holland, residing at 15 Rue d'Albanie St.-Gilles, Brussels, Belgium, have invented certain new and useful Improvements in Petroleum and other Hydrocarbon Oils; and I do declare the following to be a full, clear, and exact description of the invention, such as will enable others skilled in the art to which it appertains to make and use the same.

This invention has for its objects an improved treatment of petroleum and shale oils.

It is characterized by the fact, that certain heavy oil fractions, generally considered as by-products of the production of illuminating oil can be utilized in the production of lamp oils, by means of the successive treatment of the said fractions with a comparatively high percentage of sulfuric acid and with an aqueous solution of ammonia containing commercial litmus i. e., the so-called "litmus cubes" for the purpose of obtaining oils suitable (as regards flash point and viscoscity) for use in lamps, having a higher Abel flash point and, with regard to their specific gravities, a greater illuminating power than those generally used, and to completely or partially deodorize, decolorize and purify said oil. The oil to be treated, whether crude or not, is preferably first submitted to fractional distillation. The fractions generally distilling between 150° C. and 200° C., having specific gravities from 0.770 to 0.795 at 15° C. and Abel flash points between 18° C. and 40° C., are used for making a turpentine substitute.

The fractions having specific gravities from 0.790 to 0.840 at 15° C. and Abel flash points between 40° C. and 100° C., generally distilling between 180° C. and 300° C., are utilized for the production of an illuminating oil. The selection of these fractions depends somewhat on the quantity of paraffin bodies contained in the oil or distillate under treatment. These substances increase in the final fractions of the distillation. So the final portions of every paraffinous oil should be tested and the paraffin removed, if necessary, before submitting the aforesaid fractions to the subsequent treatment. The specific gravity as well as the flash points will vary more or less with the varieties of oil treated.

For instance, when carrying out my process in accordance with this invention, I apply the same to say a crude commercial distillate of Boryslav petroleum. This distillate is separated by fractional distillation into the following proportions:

3 parts by volume of 0.7570 specific gravity at 15° C.

24 parts by volume of 0.7760 to 0.7780 specific gravity at 15° C.

73 parts by volume of 0.8255 specific gravity at 15° C., the last mentioned fraction having an Abel flash point of 65° C.

The third portion is the one to be principally considered in connection with this invention. The oil, constituting this portion, is submitted to the following treatment.

The separation of the tarry bodies is effected in the ordinary manner by agitating with sulfuric acid of 66° Baumé (specific gravity 1.840). The quantity of acid employed varies according to circumstances and is generally larger for my process than in the processes usually employed, and preferably approximates to or exceeds 3% of the weight of the oil or fraction to be treated therewith. After settling, the oil is decanted from the acid and subjected to the following alkaline treatment.

To 1000 parts of the decanted oil is added a mixture containing about 1 part of litmus cubes, 1 part of aqueous ammonia (28° Bé. or 0.886 to 0.890 specific gravity, containing about 33% $NH_3$) and 2 parts of water, (the parts are by weight). A larger quantity can be used if necessary, as in case of treating a very impure oil fraction. After the incorporation of ammonia, litmus and water with the oil being treated, agitation is carried on for half an hour and settling allowed for several hours.

The oil is now separated by decantation. The use of sulfuric acid and of ammonia has already been recommended, but the combined treatment with both substances and litmus, unknown till now in the industry of petroleum and other mineral oils, leads to a superior final result.

The mixture containing ammonia and litmus is employed to effect deodorization, decoloration and clarification of the oil. The litmus in colloidal solution carries down certain heavy, greasy, finely divided matters present in the oil in colloidal solution. The carbonate of lime, etc., in the litmus also aids in clarification of the oil, as it also carries down certain finely divided matters. The effect of the litmus is to decolorize and clarify the distillate, and to aid in removing objectionable odors.

For the treatment of highly impure oil fractions, it is preferable to decant the alkaline solution of the soluble constitutents of the litmus cubes, from the insoluble matter or sediment before adding the said solution to the oil which has been treated with acid.

The ammonia is employed to neutralize any acid remaining in the oil, which acid exists therein as complex sulfo derivatives of hydrocarbons, and not as free acid; ammonia has the advantage over soda that it does not form substances as soda does that have a tendency to clog the wicks.

To the oil, now slightly yellow, is preferably added Florida's fullers' earth, previously heated to a temperature of from 115° C. to 150° C., to remove the yellow color. After agitation and settling, the oil is decanted.

The burning oil, thus obtained, is substantially odorless; it burns well, does not produce objectionable odors while burning, and has a high illuminating power.

Although this invention is more particularly described with reference to a crude distillate of Boryslav petroleum, it will be understood that it is applicable to other varieties of petroleum or mineral oil with the result that ultimate products of high commercial values are obtained. The treatment with an ammoniacal solution of litmus can be applied to any fraction of the distilled oil.

The following examples of the treatment of other oils by the process of my invention, are given, to more fully illustrate the invention.

A crude Burmah oil having a specific gravity of 0.815 at 15° C. and an Abel flash point of 20° C., gave a fraction having a gravity suitable for producing illuminating oil equal to 32% of the weight of the crude oil. This fraction was treated by the sulfuric acid, ammoniacal solution of litmus and Florida's fullers' earth process, as above described, and gave a product having a specific gravity of 0.833 at 15° C. and an Abel flash point of 68° C.

A Scotch shale oil, called "Twice run" having a specific gravity of 0.815 at 15° C. and an Abel flash point of 48° C. gave, by fractionation, burning oil fractions having specific gravities between 0.790 and 0.832 at 15° C. and Abel flash points between 55° C. and 100° C. These fractions, being 64% of the initial bulk, were treated by the method above described, with 5% of sulfuric acid of 66° Baumé (specific gravity 1.840) and then with the ammoniacal solution of litmus, as above referred to.

A Sumatra crude oil having a specific gravity of 0.769 at 15° C. and an Abel flash point of 0° C., gave 36% of illuminating oil that when treated by the sulfuric acid, ammoniacal solution of litmus and fullers' earth process, as above described, had a specific gravity of 0.800 at 15° C. and an Abel flash point of 48° C.

A Borneo crude oil having a specific gravity of 0.879 at 15° C. and an Abel flash point of 70° C., gave 6% of an illuminating oil fraction having a specific gravity of 0.842 at 15° C. and an Abel flash point of 27° C., and also gave 14% of a second illuminating oil fraction having a specific gravity of 0.882 at 15° C., and an Abel flash point of 75° C., both of these fractions having been treated by the sulfuric acid, ammoniacal solution of litmus, and fullers' earth process.

A Galicia crude oil having a specific gravity of 0.828 at 15° C., and an Abel flash point of 22° C., gave 10% of a first illuminating oil fraction having a specific gravity of 0.835 at 15° C. and an Abel flash point of 60° C., and 10% of an illuminating oil fraction having a specific gravity of 0.872 at 15° C. and an Abel flash point of 85° C., when treated by my process, as above described.

A Galicia (wielopol) crude oil having a specific gravity of 0.8385 at 15° C. and an Abel flash point of 29° C. gave 15% of an illuminating oil fraction, having a specific gravity of 0.828 and an Abel flash point of 60° C. and 4% of an illuminating oil fraction having a specific gravity of 0.865 at 15° C., and an Abel flash point of 80° C. when treated by my process, as above described.

A Galicia (petrolea) crude oil having a specific gravity of 0.814 at 15° C. and an Abel flash point of 18° C., gave 15% of an illuminating oil fraction having a specific gravity of 0.812 at 15° C. with an Abel flash point of 52° C., when treated by my process, as above described.

A Galicia (kabylanka) crude oil having a specific gravity of 0.835 at 15° C. and an Abel flash point of 26° C. gave 30% of an illuminating oil fraction having a specific gravity of 0.849 at 15° C. and an Abel flash point of 74° C., when treated by my process, as above described.

A Roumania (schela tintea) crude oil having a specific gravity of 0.897 at 15° C. and an Abel flash point of 36° C. gave 15% of an illuminating oil fraction having a specific gravity of 0.825 at 15° C. and an Abel flash point of 70° C., and 5% of illuminating oil having a specific gravity of 0.868 at 15° C. and an Abel flash point of 88° C. when treated by my process, as above described.

A Roumania crude oil (buzeu) having a specific gravity of 0.8085 at 15° C. and an Abel flash point of 28° C., gave 21% of an illuminating oil having a specific gravity of 0.8245 at 15° C. and an Abel flash point of 72° C., when treated by my process, as above described.

A Hanover crude oil (wietze-steinfurt) having a specific gravity of 0.951 at 15° C. and an Abel flash point of 100° C. gave 26% of an illuminating oil having a specific gravity of 0.870 at 15° C. and an Abel flash point of 89° C., when treated by my process, as above described.

In all these cases, the illuminating oils, after treatment by my process, were of a superior character with regard to appearance, color, odor, combustibility and illuminating power.

Moreover the products produced were safety oils, as proved by the flash points, which were much higher than those of many of the illuminating oils, consisting of petroleum fractions, now on the market.

The present application is a division of my copending application Serial No. 537,858, filed Jan. 13, 1910, (which has now matured into Patent No. 1,194,033, Aug. 8, 1916).

What I claim is:

1. The improved process of treating petroleum and shale oils consisting in the treatment of fractions having a specific gravity of 0.790 to 0.840 and Abel flash points between 40° C. and 100° C., distilling at temperatures between about 180° C. and about 300° C., with sulfuric acid and after that with an aqueous solution of ammonia and litmus substantially as and for the purpose set forth.

2. The process of treating oil distillates, which comprises acting thereon with an acid, and thereafter with ammonia and litmus.

3. The process of treating oil distillates which comprises acting thereon with sulfuric acid, and thereafter with ammonia and litmus.

4. The process of treating oil distillates, which comprises acting thereon with an acid, and thereafter with ammonia and litmus and finally treating with fullers' earth.

5. The process of treating oil distillates, which comprises acting thereon with sulfuric acid, and thereafter ammonia and litmus, and finally treating with fullers' earth.

6. In the treatment of acid-treated hydrocarbon oils the step of treating the same with an ammoniacal solution of litmus.

7. A process of treating an oil distillate having a specific gravity of about 0.8255 which comprises treating with strong sulfuric acid in amount equal to about 3% of the weight of the distillate, and thereafter treating with an aqueous solution of ammonia and litmus each in amount equal to at least about 0.1% of the weight of the distillate.

8. A process of treating an oil distillate having a specific gravity of about 0.8255 which comprises treating with strong sulfuric acid in amount equal to about 3% of the weight of the distillate, and thereafter treating with an aqueous solution of ammonia and litmus each in amount equal to at least about 0.1% of the weight of the distillate, and thereafter treating said distillate with fullers' earth.

In testimony whereof I have affixed my signature in the presence of two witnesses.

HERMAN WILLEM KNOTTENBELT.

Witnesses:
 EDOUARD HARZEN,
 E. MEYER.